United States Patent
Noh et al.

(10) Patent No.: US 11,634,002 B2
(45) Date of Patent: Apr. 25, 2023

(54) VEHICLE BODY FRAME USING COMPONENT INTEGRATION TYPE REAR LOWER

(71) Applicants: Hyundai Motor Company, Seoul (KR); Kia Corporation, Seoul (KR)

(72) Inventors: Seung-Ho Noh, Anyang-si (KR); Seung-Min Jeong, Hwaseong-si (KR); Hee Seouk Chung, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 17/362,243

(22) Filed: Jun. 29, 2021

(65) Prior Publication Data
US 2022/0305871 A1   Sep. 29, 2022

(30) Foreign Application Priority Data

Mar. 25, 2021   (KR) .......................... 10-2021-0039080

(51) Int. Cl.
B60G 21/05   (2006.01)
(52) U.S. Cl.
CPC ........ B60G 21/052 (2013.01); *B60G 2200/21* (2013.01); *B60G 2204/1434* (2013.01); *B60G 2206/203* (2013.01)
(58) Field of Classification Search
CPC .............. B60G 21/052; B60G 2200/21; B60G 2204/1434; B60G 2204/15;
(Continued)

(56) References Cited

U.S. PATENT DOCUMENTS 3,869,017 A  *  3/1975 Feustel ................ B62D 21/155
                                                                  248/548
10,259,506 B2    4/2019 Ayukawa
(Continued)

FOREIGN PATENT DOCUMENTS

CN          105365543 A  *  3/2016
DE   102007006722 A1    12/2008
(Continued)

OTHER PUBLICATIONS

Fang, Rear Suspension and Vehicle Body of Electric Automobile, Mar. 2, 2016, EPO, CN 105365543 A, Machine Translation of Description (Year: 2016).*

*Primary Examiner* — Paul N Dickson
*Assistant Examiner* — Matthew D Lee
(74) *Attorney, Agent, or Firm* — Slater Matsil, LLP

(57) ABSTRACT

An embodiment component integration type rear lower includes a body frame having an end portion of a first side and an end portion of a second side and having a predetermined length, a front-rear connection member connecting a side sill at the end portion of the first side and connecting a rear side member at the end portion of the second side, a bush mounting member coupling a bush to the end portion of the first side, and a coupled torsion beam axle (CTBA) mounting member coupled to at least one of a CTBA, a chassis spring, or a shock absorber, the at least one of the CTBA, the chassis spring, or the shock absorber being engaged with the end portion of the second side.

23 Claims, 7 Drawing Sheets

(58) Field of Classification Search
CPC ............ B60G 2206/203; B62D 21/152; B62D 21/155; B62D 25/025; B62D 25/088; B62D 25/2027; B62D 27/04
See application file for complete search history.

(56) References Cited

U.S. PATENT DOCUMENTS

| | | |
|---|---|---|
| 2010/0164214 A1 | 7/2010 | Hartmann et al. |
| 2015/0042129 A1 | 2/2015 | Cho et al. |
| 2019/0299736 A1* | 10/2019 | Hisamura .............. B60G 7/001 |
| 2021/0001680 A1 | 1/2021 | Italiano et al. |

FOREIGN PATENT DOCUMENTS

| | | | |
|---|---|---|---|
| DE | 102009055634 A1 * | 6/2010 | ............. B62D 25/08 |
| EP | 0774369 A1 | 5/1997 | |
| EP | 0937631 A2 | 8/1999 | |
| EP | 0937631 A3 | 8/2001 | |
| EP | 3663170 A1 | 6/2020 | |
| KR | 101490923 B1 | 2/2015 | |
| KR | 20190081043 A | 7/2019 | |
| WO | WO-0108909 A1 * | 2/2001 | ............. B60G 11/27 |
| WO | WO-2011111543 A1 * | 9/2011 | ............ B60G 21/051 |
| WO | WO-2012039665 A1 * | 3/2012 | ............. A61G 3/065 |
| WO | WO-2015029550 A1 * | 3/2015 | ............ B60G 21/052 |

* cited by examiner

FIG.2
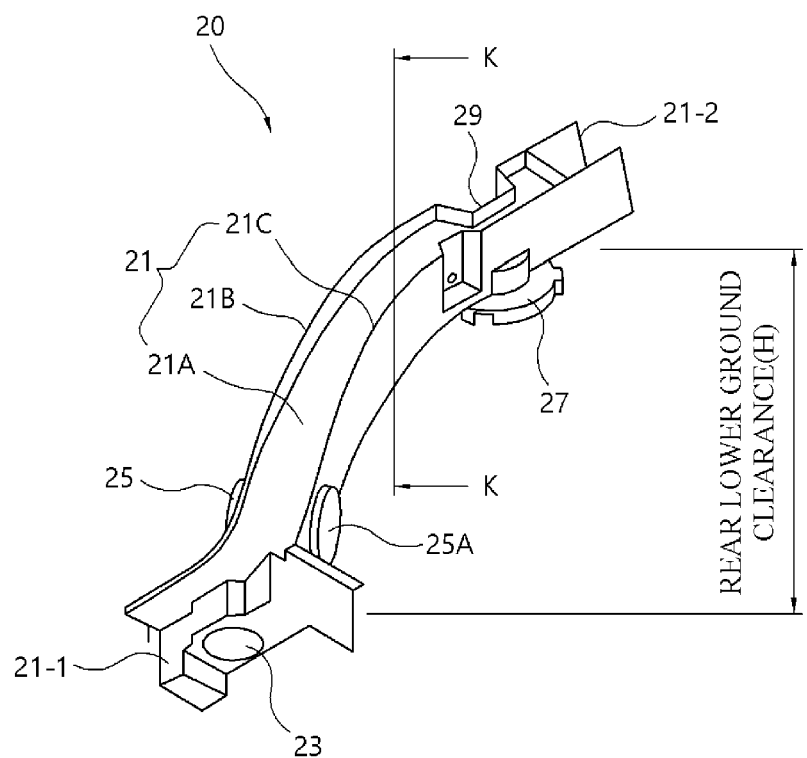
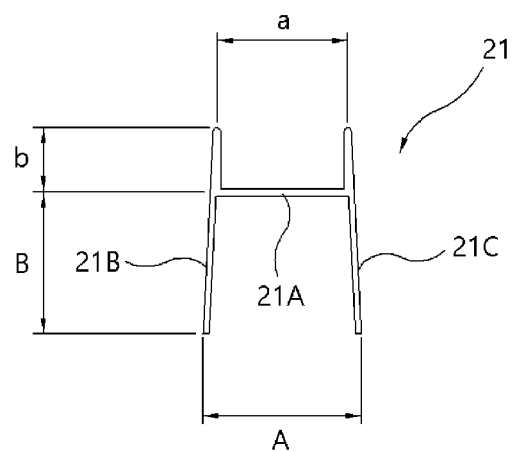
SECTION K-K

FIG.4
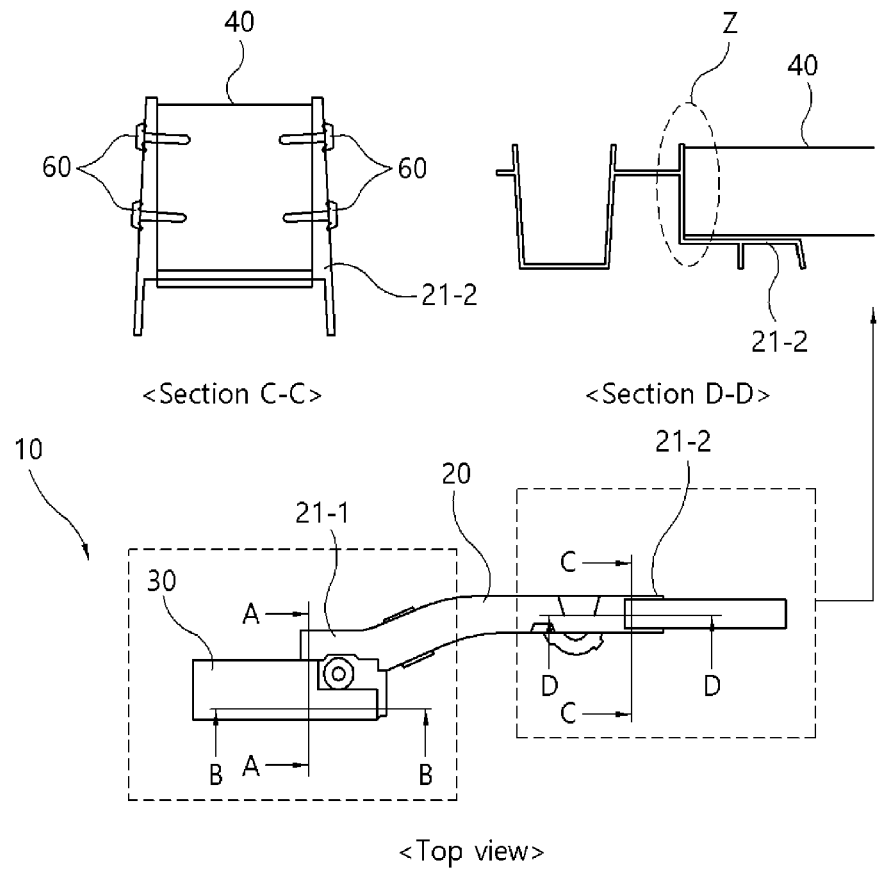
● PARTITION RIB FORMING PORTION
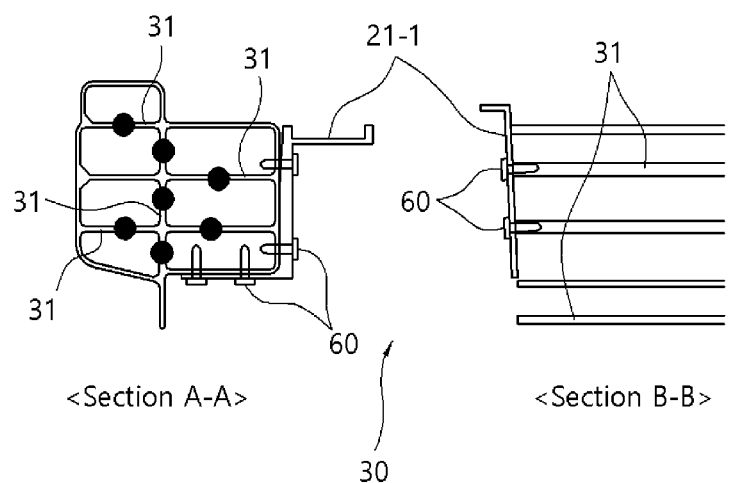

VEHICLE BODY FRAME USING COMPONENT INTEGRATION TYPE REAR LOWER

CROSS-REFERENCE TO RELATED APPLICATIONS

This application claims priority to Korean Patent Application No. 10-2021-0039080, filed on Mar. 25, 2021, which application is hereby incorporated herein by reference.

TECHNICAL FIELD

Exemplary embodiments of the present disclosure relate to a vehicle body frame.

BACKGROUND

Generally, a rear lower (or a rear lower member) of a vehicle forms a rear connection structure of a vehicle body frame so as to absorb an impact from a rear collision and safely protect the vehicle.

To this end, one side portion of the rear lower includes a plurality of reinforcing members protruding and bent forward/backward to increase rigidity, and a rear side member, a spring seat/sub-frame bracket, and a rear side panel are applied to the one side portion thereof so that the one side portion thereof is formed by integrating related parts including a bracket through a bonding process.

In particular, the rear lower also provides an engagement structure for a rear wheel suspension, thereby providing a support member welding structure on one side of the spring seat and a side surface of the rear lower using the plurality of reinforcing members.

However, since the rear lower is formed in a bonding structure of a plurality of parts using a rear lower panel and the plurality of reinforcing members, a complex structure and a weight increase may be caused and defects in a welded portion may occur.

For example, the rear lower is formed of about ten parts, and eight parts are applied as reinforcing members for rigidity. Paradoxically, since such a large number of reinforcing members increase a weight and a material cost and require a coupling structure between panels using welding, degradation in rigidity support force for a rear lower portion also occurs.

In particular, when the rear lower is mounted on the rear wheel suspension, an offset amount between a suspension mounting structure and parts of a side sill and/or a rear side member, which are major components of the vehicle body frame, is present, and the offset amount inevitably makes rigidity of the rear lower portion more vulnerable.

SUMMARY

Exemplary embodiments of the present disclosure relate to a vehicle body frame. Particular embodiments relate to a vehicle body frame in which a rear lower to which a rear connection structure is applied is manufactured in a component integration type structure by die-casting so that the number of parts is extremely reduced and which is easily modified according to a design intent of a purpose built vehicle (PBV).

An embodiment of the present disclosure is directed to a vehicle body frame in which a weight reduction and a reduction in material cost are achieved due to a simplified structure such that an entire rear connection structure of the side sill and a rear side member is formed with a rear lower in a component integration type structure using die-casting without an application of a plurality of reinforcing materials and, in particular, rigidity of a coupled torsion beam axle (CTBA) is secured in a CTBA mounting structure using the rear lower, and a component integration type rear lower, which is easily modified according to a design intent of a purpose built vehicle (PBV) due to formability of the die-casting according to a size of the rear lower, is applied.

Other features and advantages of embodiments of the present disclosure can be understood by the following description and become apparent with reference to the embodiments of the present disclosure. Also, it is obvious to those skilled in the art to which the present disclosure pertains that the features and advantages of the present disclosure can be realized by the means as claimed and combinations thereof.

In accordance with an embodiment of the present disclosure, there is provided a component integration type rear lower including a body frame which includes an end portion of one side and an end portion of the other side and having a predetermined length and which is integrated with a front-rear connection member configured to connect a side sill at the end portion of one side and connect a rear side member at the end portion of the other side, a bush mounting member in which a bush is coupled to the end portion of one side, and a coupled torsion beam axle (CTBA) mounting member to which one or more among a CTBA, a chassis spring, and a shock absorber are engaged with the end portion of the other side.

As an exemplary embodiment, the body frame may be made of aluminum and may be molded by die-casting so that the front-rear connection member, the bush mounting member, and the CTBA mounting member may be integrated.

As an exemplary embodiment, the body frame may have a height difference between the end portion of one side and the end portion of the other side to form a rear lower ground clearance and may be formed in an "H" cross-sectional structure.

As an exemplary embodiment, the front-rear connection member may include a center connector on which the side sill is placed from the top on an upper surface open space portion extending from the end portion of one side, and a rear connector which extends from the end portion of the other side to an open space and in which the rear side member is fitted in an upper surface of the open space.

As an exemplary embodiment, the rear connector may form an inner wall in a lateral direction with respect to an upper surface in which the rear side member is fitted so as to allow an end surface of the rear side member to be pressed against.

As an exemplary embodiment, the bush mounting member may include a bush mounting hole drilled in a center connector extending from the end portion of one side to form an upper surface open space so as to allow the side sill to be mounted from the top.

As an exemplary embodiment, the CTBA mounting member may include a trailing arm connector protruding from the end portion of one side to form a lateral open space so as to allow a partial portion of the CTBA to be fitted at a lateral portion, a spring seat protruding from a lower surface of the end portion of the other side to form a lower surface open space so as to allow an upper portion of the chassis spring to be fitted from the top, and a shock absorber connector forming a lateral open space at a side surface of the end portion of the other side so as to allow an upper portion of the shock absorber to be fitted in a lateral portion.

As an exemplary embodiment, a rear lower hole for a screw engagement with a bolt engaged with the partial portion of the CTBA may be drilled in the trailing arm connector.

As an exemplary embodiment, the side sill may be formed in an extruded material structure.

In accordance with another embodiment of the present disclosure, there is provided a vehicle body frame including a side sill forming a frame of an intermediate section of a vehicle and expanding to a battery space in which a battery is mounted, a rear side member forming a frame of a rear section of the vehicle, and a rear lower which includes a body frame of a predetermined length with a height difference formed by a rear lower ground clearance, and in which a connection section between the side sill and the rear side member is formed of a front-rear connection member, an engagement portion between the side sill and a bush is formed of a bush mounting member, and an engagement portion of a rear wheel suspension is formed of a coupled torsion beam axle (CTBA) mounting member.

As an exemplary embodiment, the rear lower may be made of aluminum and may be molded by die-casting so that the front-rear connection member, the bush mounting member, and the CTBA mounting member may be integrated with the body frame.

As an exemplary embodiment, the front-rear connection member may fix the side sill and the rear side member using an engagement member.

As an exemplary embodiment, the engagement member and the side sill, and the engagement member and the rear side member are fixed by a flow drill screw (FDS) method.

As an exemplary embodiment, the front-rear connection member may include a center connector in which a partial portion of the side sill is placed from the top in an upper surface open space portion extending from the body frame in a connection section of the side sill, and a rear connector in which the body frame is extended to an open space so that a partial portion of the rear side member is fitted on an upper surface of the open space in a connection section of the rear side member.

As an exemplary embodiment, an end portion of the rear side member may be in close contact with an inner wall of the rear connector.

As an exemplary embodiment, a space of the side sill may be divided by partition ribs fixed to the center connector of the rear lower by the FDS method, and the center connector may extend from the end portion of one side to be formed as an upper surface open space so as to allow the side sill to be placed from the top.

As an exemplary embodiment, the rear side member may form an open rectangular cross-sectional structure or a closed rectangular cross-sectional structure.

As an exemplary embodiment, the bush mounting member may include a bush mounting hole fixed by a bush shaft in a state in which the bush is fitted in, and in the connection section of the side sill, the bush mounting hole may be formed by being drilled in the center connector extending from the body frame to the upper surface open space in which a partial portion of the side sill is placed from the top.

As an exemplary embodiment, the rear wheel suspension may include a CTBA, a chassis spring, and a shock absorber, and the CTBA mounting member may be engaged with one or more among the CTBA, the chassis spring, and the shock absorber.

As an exemplary embodiment, the CTBA mounting member may include a trailing arm connector protruding from a side surface of the body frame to form a lateral open space in which a trailing arm of the CTBA is fitted in a side portion in the connection section of the side sill, a spring seat protruding from a lower surface of the body frame to form a lower surface open space in which an upper portion of the chassis spring located in a spring seating portion of the CTBA is fitted from the top in the connection section of the rear side member, and a shock absorber connector recessed in a side surface of one side of the body frame to form a lateral open space in which an upper portion of the shock absorber is fitted in a side portion in the connection section of the rear side member.

As an exemplary embodiment, the trailing arm connector may form a rear lower hole which is screw-coupled to a bolt fixed to the trailing arm, and the spring seat may be formed in a cup-shaped structure which surrounds an outer diameter of a spring cup provided in the upper portion of the chassis spring.

As an exemplary embodiment, the side sill may include a left side sill and a right side sill, and a vehicle width including the battery space may be formed by as much as a separation distance between the left side sill and the right side sill.

As an exemplary embodiment, the left side sill and the right side sill may be connected by a center extruded material crossing the vehicle width.

BRIEF DESCRIPTION OF THE DRAWINGS

FIG. 2 is a perspective view illustrating a component integration type rear lower which is manufactured by molding aluminum using die-casting and constitutes a side connection member according to embodiments of the present invention.

FIG. 4 is a configurational cross-sectional view illustrating a rear connection structure in which a vehicle body frame is formed through a component integration type rear lower according to embodiments of the present invention.

DETAILED DESCRIPTION OF ILLUSTRATIVE EMBODIMENTS

Exemplary embodiments of the present disclosure will be described below in more detail with reference to the accompanying drawings, and these embodiments are examples of the present disclosure and may be embodied in various other different forms by those skilled in the art to which the present disclosure pertains so that the present disclosure is not limited to these embodiments.

Figure 1:
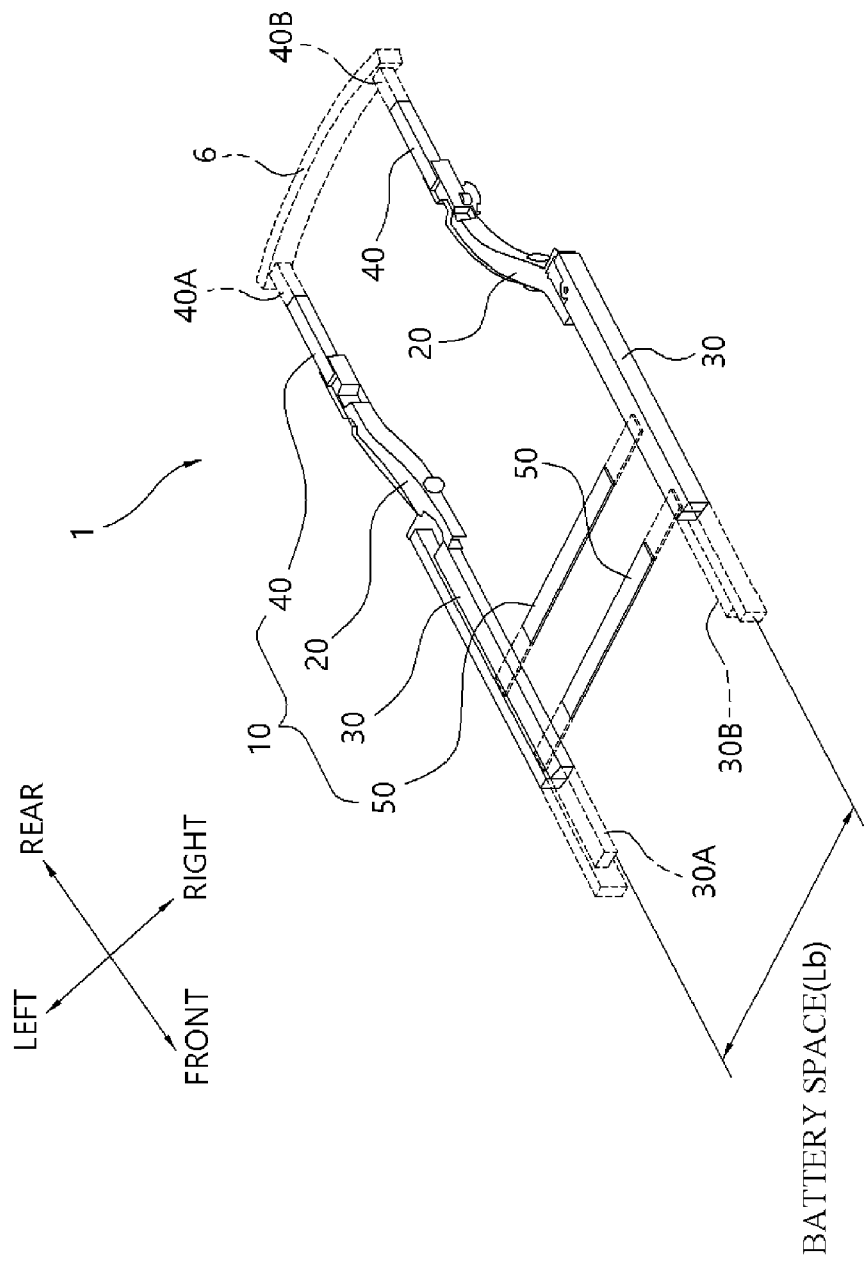
FIG. 1 is a configurational diagram illustrating a vehicle body frame to which a component integration type rear lower is applied according to embodiments of the present invention.

Referring to FIG. 1, the vehicle body frame 1 includes a side connection member 10 which is formed of a side sill 30 and a rear side member 40. In this case, in the vehicle body frame 1, a front side member (not shown) is connected in front of the side sill 30.

Specifically, in the side connection member 10, a rear lower 20 connects the side sill 30 to the rear side member 40, and left/right side sills 30A and 30B are fixed using a center extruded material 50.

For example, the rear lower 20 forms a front-rear connection member (or an entire rear connection structure) which connects the side sill 30 to the rear side member 40.

Thus, the rear lower 20 is formed of a left rear lower and a right rear lower, the left rear lower connects the left side sill 30A of the side sill 30 to a left rear side member 40A of the rear side member 40, and the right rear lower connects the right side sill 30B of the side sill 30 to a right rear side member 40B of the rear side member 40.

In particular, each of the left rear lower and the right rear lower of the rear lower 20 is manufactured by a die-casting method using an aluminum material, and thus the rear lower 20 is characterized as a component integration type rear lower 20 which is formed of one part to which a separate reinforcing member is not applied.

For example, the side sill 30 is formed of the left side sill 30A and the right side sill 30B, and the left side sill 30A and the right side sill 30B are connected by the center extruded material 50. In this case, the left side sill 30A and the right side sill 30B form left/right lower side surfaces in an intermediate section of the vehicle and are spaced apart from each other to form a battery space width Lb. The center extruded material 50 crosses the battery space width Lb to connect the left/right side sills 30A and 30B and is provided as two or more center extruded materials spaced apart from each other by an interval.

In particular, each of the left side sill 30A and the right side sill 30B may be formed in a structure of an extruded material such as the center extruded material 50 to have enhanced rigidity and enhanced durability. In this case, the extruded material is made of aluminum.

Thus, the side sill 30 forms a center frame of the vehicle body frame 1 with an integrated structure of the extruded material.

Therefore, an end portion of one side of the left side sill 30A of the side sill 30 is assembled with an engagement member 60 (see FIG. 4) at the left rear lower of the rear lower 20, and an end portion of one side of the right side sill 30B of the side sill 30 is assembled with the engagement member 60 (refer to FIG. 4) at the right rear lower of the rear lower 20.

For example, the rear side member 40 is formed of the left rear side member 40A and the right rear side member 40B, and the left rear side member 40A and the right rear side member 40B form left/right lower side surfaces in a rear section of the vehicle. In this case, end portions of one side of the left/right rear side members 40A and 40B are connected to a rear bumper back beam 6 which is a component of a rear bumper (not shown).

In particular, a cross section with a hollow inner space formed by welding two panels is formed at each of the left rear side member 40A and the right rear side member 40B. In this case, each of the left/right rear side members 40A and 40B is made of aluminum.

In addition, the rear side member 40 is formed in an open rectangular cross-sectional shape of "LI" or a closed rectangular cross-sectional shape of " " (see FIG. 4) and is formed of the left rear side member 40A and the right rear side member 40B.

In particular, an end portion of one side of the left rear side member 40A of the rear side member 40 is assembled with the engagement member 60 (see FIG. 4) at the left rear lower of the rear lower 20, and an end portion of one side of the right rear side member 40B of the rear side member 40 is assembled with the engagement member 60 (refer to FIG. 4) at the right rear lower of the rear lower 20.

Meanwhile, referring to FIG. 2, the rear lower 20 is formed of a gently curved body frame 21, and the front-rear connection member, a bush mounting member (or a bush mounting structure), and a CTBA mounting member (or a CTBA mounting structure) are integrally formed on the body frame 21, and thus the rear lower 20 is characterized as the component integration type rear lower 20.

For example, the body frame 21 is formed of a left vertical body 21B and a right vertical body 21C which are vertical with respect to a horizontal body 21A to form an "H" cross-sectional structure, and one side and the other side of the body frame 21 form a height difference of a rear lower ground clearance H so that the body frame 21 is easily mounted on a chassis spring 300 and a shock absorber 400 of the rear wheel suspension. In this case, a position of the left vertical body 21B may be defined as a position toward an inner space of the vehicle, and a position of the right vertical body 21C may be defined as a position toward an outer space of the vehicle.

In particular, in the body frame 21, an upper position b of the horizontal body 21A is located to be higher than a lower position B with respect to the left/right vertical bodies 21B and 21C, and a lower width A due to the left/right vertical bodies 21B and 21C is formed to be greater than an upper width a so that the "H" cross-sectional structure is formed in a trapezoidal shape.

For example, the front-rear connection member is integrally formed on the end portion of one side of the body frame 21 and includes a horizontally extended center connector 21-1 and a rear connector 21-2 which is integrally formed on an end portion of the other side of the body frame 21 to be extended horizontally.

For example, the bush mounting member includes a bush mounting hole 23 drilled in the center connector 21-1. In this case, the bush mounting hole 23 is formed in a circular shape.

Specifically, the CTBA mounting member includes a trailing arm connector 25 formed to protrude horizontally from a side surface of the body frame 21 with an interval from the center connector 21-1 on one side of the body frame 21, a spring seat 27 formed to protrude vertically from a lower surface of the body frame 21 with an interval from the rear connector 21-2 on the other side of the body frame 21, and a shock absorber connector 29 formed as a space on a side surface of one side of the body frame 21 with an interval from the rear connector 21-2 on the other side of the body frame 21.

Figure 6:
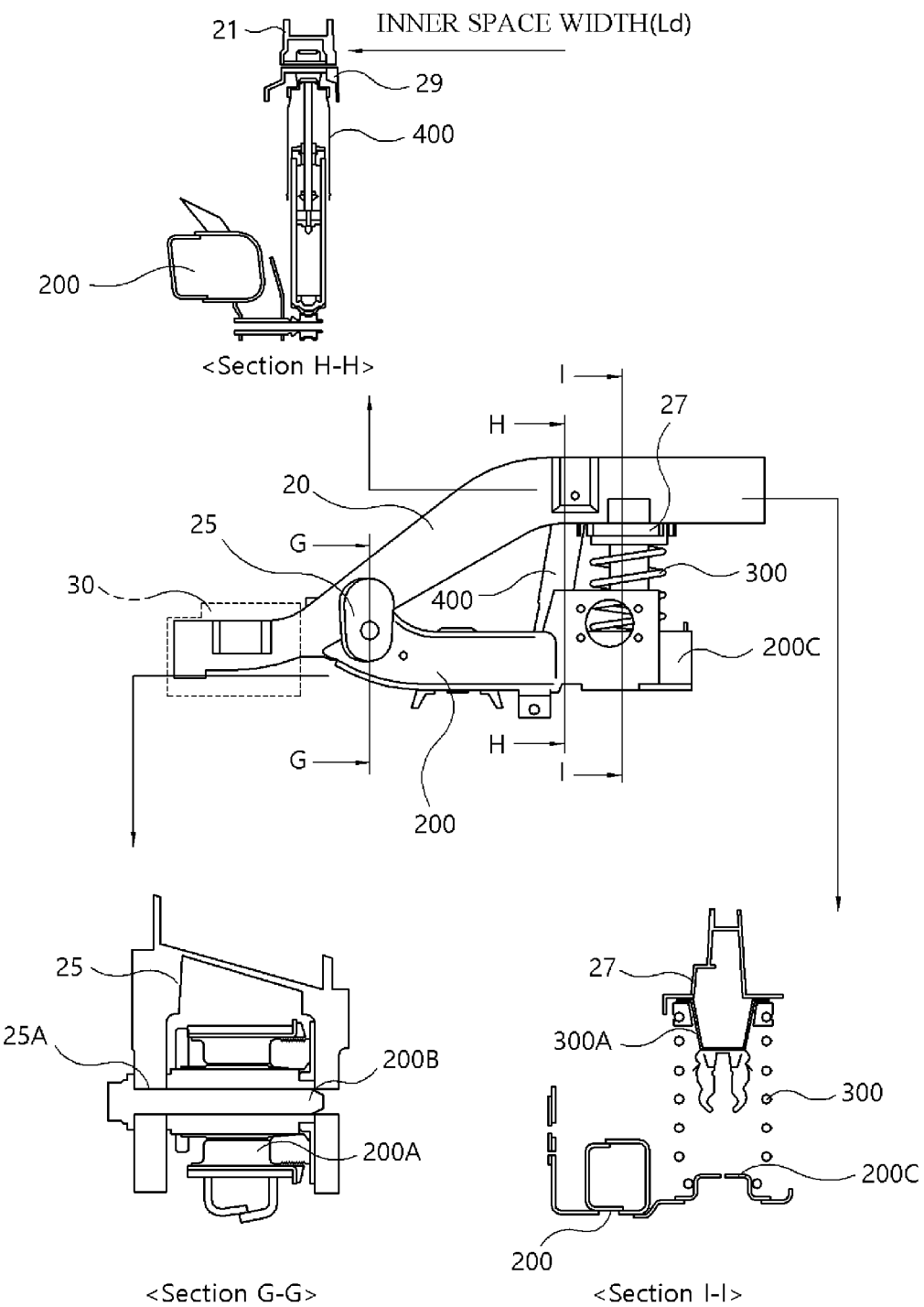
FIG. 6 is a diagram illustrating an example in which a vehicle body frame forms a coupled torsion beam axle (CTBA) mounting structure through a component integration type rear lower so that an interior space of a vehicle is expanded according to embodiments of the present invention.

For example, the trailing arm connector 25 is formed of left/right flanges protruding horizontally from the left/right vertical bodies 21B and 21C of the body frame 21 and surrounds portions of a trailing arm 200A of a CTBA 200 (see FIG. 6), and the left/right flanges are drilled so as to form a female thread of a rear lower hole 25A for a screw engagement with a bolt 200B (see FIG. 6).

For example, the spring seat 27 is formed by extending the left/right flanges protruding vertically from the left/right vertical bodies 21B and 21C of the body frame 21 in a cup shape (see FIG. 7), and the cup shape surrounds and seats an end portion of the chassis spring 300 coupled to a spring cup 300A.

For example, the shock absorber connector 29 is formed in a structure in which the left vertical body 21B of the body frame 21 is pushed to and inserted into the horizontal body 21A in a portion in which the spring seat 27 is formed, thereby forming a side-open structure, and an upper portion of the shock absorber 400 (see FIG. 6) is located in the side-open structure.

Meanwhile, FIGS. 3 to 7 illustrate an example in which the rear wheel suspension is mounted on the side connection member 10 using the component integration type rear lower 20 in the vehicle body frame 1.

Figure 3:
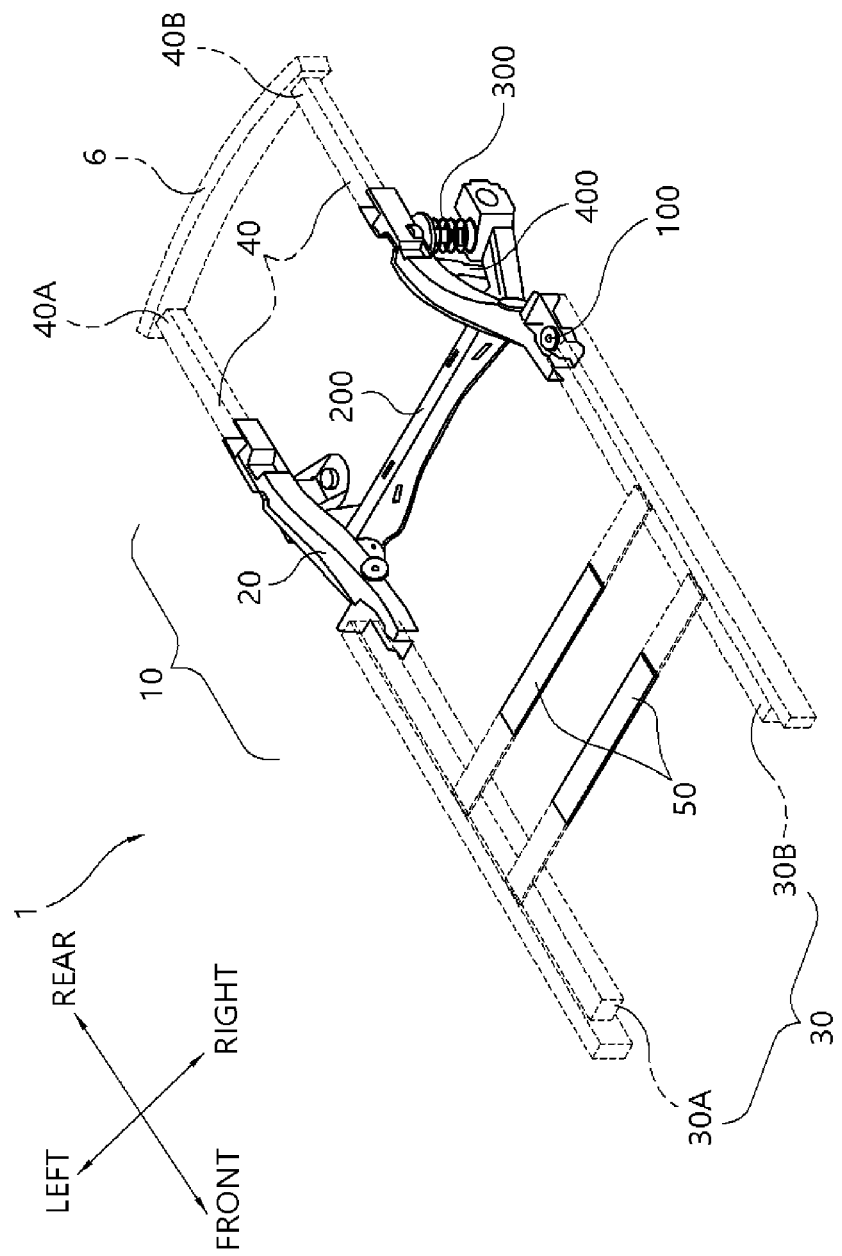
FIG. 3 is a diagram illustrating a state in which a vehicle body frame is assembled with a rear wheel suspension using a component integration type rear lower according to embodiments of the present invention.

Referring to FIG. 3, the vehicle body frame 1 includes the side connection member 10 in which the rear lower 20 connects the side sill 30 to the rear side member 40.

Specifically, the side connection member 10 fixes the side sill 30 and the rear side member 40 using the front-rear connection member of the rear lower 20, fixes the bush 100 and the side sill 30 through a bush shaft 100A using the bush mounting member, and fixes the CTBA 200, the chassis spring 300, and the shock absorber 400, which are components of the rear wheel suspension, using the CTBA mounting member.

In particular, since the rear lower 20 is manufactured by injection molding aluminum using a die-casting method (that is, a low pressure die-casting method), the rear lower 20 is easily adjusted with respect to rear lower specifications (i.e., a size and a length), and the easiness of changing the rear lower specifications satisfies a design characteristic of a purpose built vehicle (PBV) which requires a length change according to the purpose of the vehicle.

Referring to FIGS. 2 and 4, the front-rear connection member is implemented using the center connector 21-1 and the rear connector 21-2 which are formed on the body frame 21 of the rear lower 20.

For example, the center connector 21-1 of the rear lower 20 faces upward and seats the side sill 30 in an open space of an upper surface extending from the end portion of one side of the rear lower 20. Meanwhile, the rear connector 21-2 of the rear lower 20 extends from the end portion of the other side of the rear lower 20 to an open space in a "⊂" shape so that the rear side member 40 is fitted and seated in and fixed to an upper surface of the open space.

In addition, the center connector 21-1 and the side sill 30, and the rear connector 21-2 and the rear side member 40, are fixed using the engagement member 60. In this case, a screw (or a bolt) is employed as the engagement member 60, and the screw (or the bolt) is fixed to the side sill 30 and the rear side member 40 by a flow drill screw (FDS) method capable of unidirectional bonding of different materials.

For example, in the engagement member 60, as shown in a section A-A and a section B-B at the center connector 21-1, a plurality of screws (or bolts) pass through a surface contact portion, in which a wall surface of the center connector 21-1 is in contact with a wall surface of the side sill 30, by the FDS method so that the center connector 21-1 and the side sill 30 are fixed. In this case, a space of the side sill 30 may be divided into a plurality of partition ribs 31 so that the side sill 30 has more enhanced rigidity and more enhanced durability.

For example, in the engagement member 60, as shown in a cross section C-C at the rear connector 21-2, a plurality of screws (or bolts) pass through a surface contact portion, in which a wall surface of the rear connector 21-2 is in contact with a wall surface of the rear side member 40, by the FDS method so that the rear connector 21-2 and the rear side member 40 are fixed.

In particular, as shown in a cross section A-A in a state in which the side sill 30 is mounted on the top, an open structure of an upper surface of the center connector 21-1 is in close contact with the side wall of the center connector 21-1 to maximize support rigidity against an external force applied in a length direction (i.e., in a horizontal direction) of the rear lower 20. In this case, the close contact means to have a welded portion in a surface contact state.

In addition, in the "⊂" shaped upper open space structure of the rear connector 21-2, the rear side member 40 is fitted in an upper surface of the open space, and as shown in a cross section D-D in such an upper surface fitting state, an end portion Z of the rear side member 40 is in close contact with an inner wall of the rear connector 21-2 in an inner space of the rear connector 21-2, thereby maximizing the support rigidity against the external force applied in the length direction (i.e., in the horizontal direction) of the rear lower 20.

Figure 5:
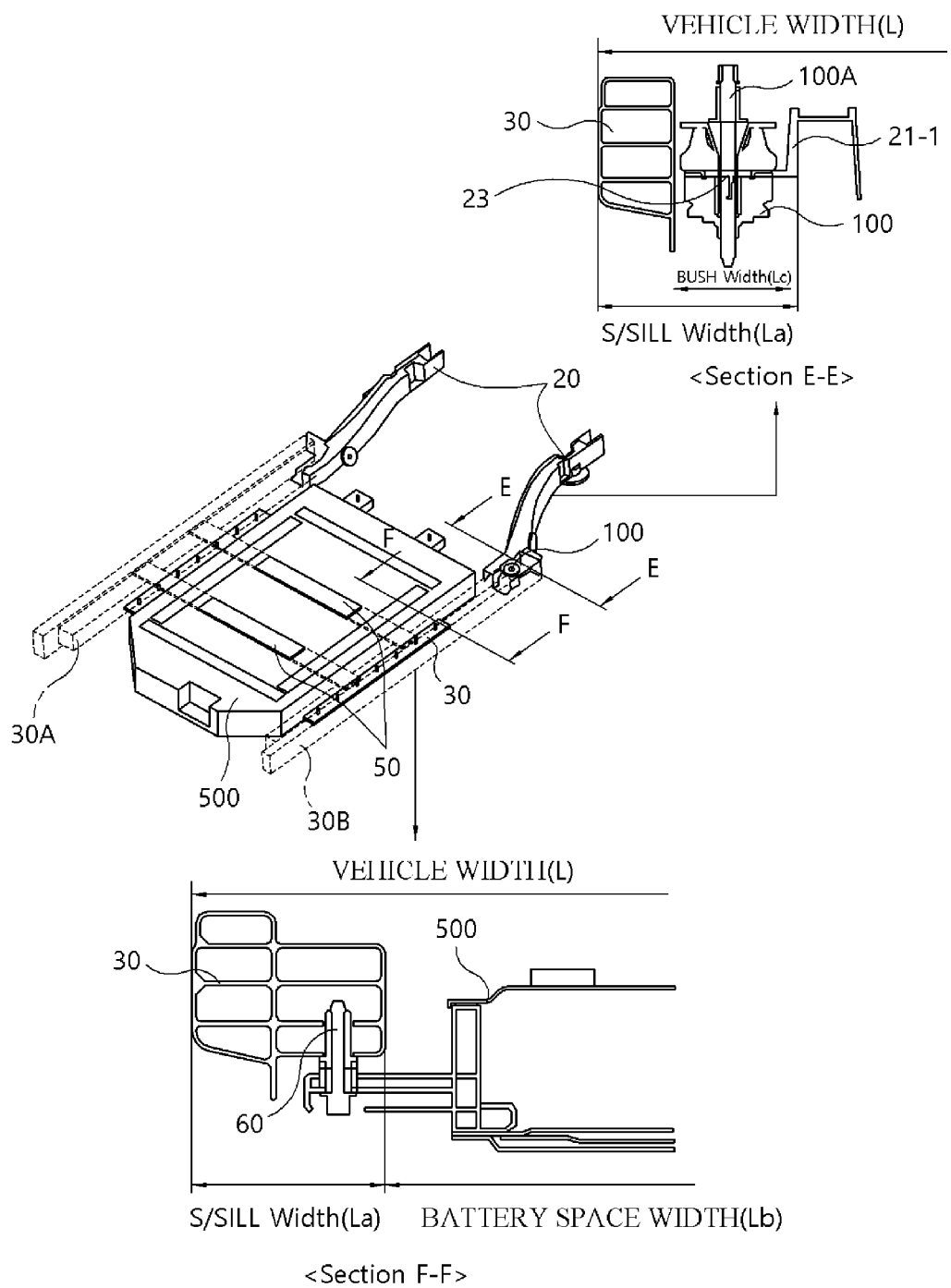
FIG. 5 is a diagram illustrating an example in which a vehicle body frame forms a bush mounting structure through a component integration type rear lower so that a battery mounting space is expanded according to embodiments of the present invention.

Referring to FIG. 5, the bush mounting member is implemented by assembling the bush 100 with the center connector 21-1, which is formed in the body frame 21 of the rear lower 20, using the bush mounting hole 23.

For example, the bush 100 is fitted in the bush mounting hole 23, and the bush shaft 100A passes through a shaft hole of the bush 100 and crosses the partition rib 31 of the side sill 30 to be fixed by a bush cap (or a bush cap nut) connected to an end portion of the bush shaft 100A.

Therefore, as shown in a cross section E-E, a bush width Lc of the bush 100 is included in a side sill width (s/sill width) La of the side sill 30, and an overlapping structure of the bush 100 and the side sill 30 may remove the bush width Lc from a vehicle width L formed by the left/right side sills 30A and 30B.

Thus, as shown in a cross section F-F, unlike the related art in which the bush width Lc and the s/sill width La of each of the left/right side sills are excluded in a utilization of a battery space width Lb from the vehicle width L formed of the left/right side sills 30A and 30B, in the vehicle body frame 1, only the s/sill width La of each of the left/right side sills is excluded so that the battery space width Lb is expanded.

As a result, due to an increase in size of the battery space width Lb when compared with the related art, a high-voltage battery 500 mounted on the vehicle body frame 1 may increase battery capacity in the same condition when compared to the related art.

Referring to FIG. 6, the CTBA mounting member is implemented by assembling the CTBA 200, the chassis spring 300, and the shock absorber 400 of the rear wheel suspension using the trailing arm connector 25, the spring seat 27, and the shock absorber connector 29 which are formed on the body frame 21 of the rear lower 20.

For example, the CTBA 200 is formed in a substantially "⌴" shape of a spring seating portion 200C in left/right side surfaces of a straight-shaped axle body, and a trailing arm 200A formed in a bent portion of the spring seating portion 200C is fitted in a lateral open space formed in the trailing arm connector 25 of the rear lower 20.

Then, as shown in a cross section G-G, the bolt 200B is fixed and screw-engaged with a pin hole of the trailing arm 200A through a rear lower hole 25A of the trailing arm connector 25 so that the CTBA 200 is assembled and integrated with the rear lower 20.

For example, in a state in which a lower portion of the shock absorber 400 is engaged with a side surface of the CTBA 200, an upper portion of the shock absorber 400 is seated in a lateral open space formed in the shock absorber connector 29 of the rear lower 20.

Then, as shown in a cross section H-H, the upper portion of the shock absorber 400 is fixed by a mounting pin or the like in a state of being located in the space of the shock absorber connector 29 so that the chassis shock absorber 400 is assembled and integrated with the rear lower 20.

For example, in a state in which a lower portion of the chassis spring 300 is seated in the spring seating portion 200C of the CTBA 200, an upper portion of the chassis spring 300, to which the spring cup 300A is coupled, is seated in a space formed in the spring seat 27 of the rear lower 20.

Then, as shown in a cross section I-I, the upper portion of the chassis spring 300 is surrounded and seated in a cup-shaped structure of the spring seat 27 together with the spring cup 300A so that the chassis spring 300 is assembled and integrated with the rear lower 20.

Figure 7:
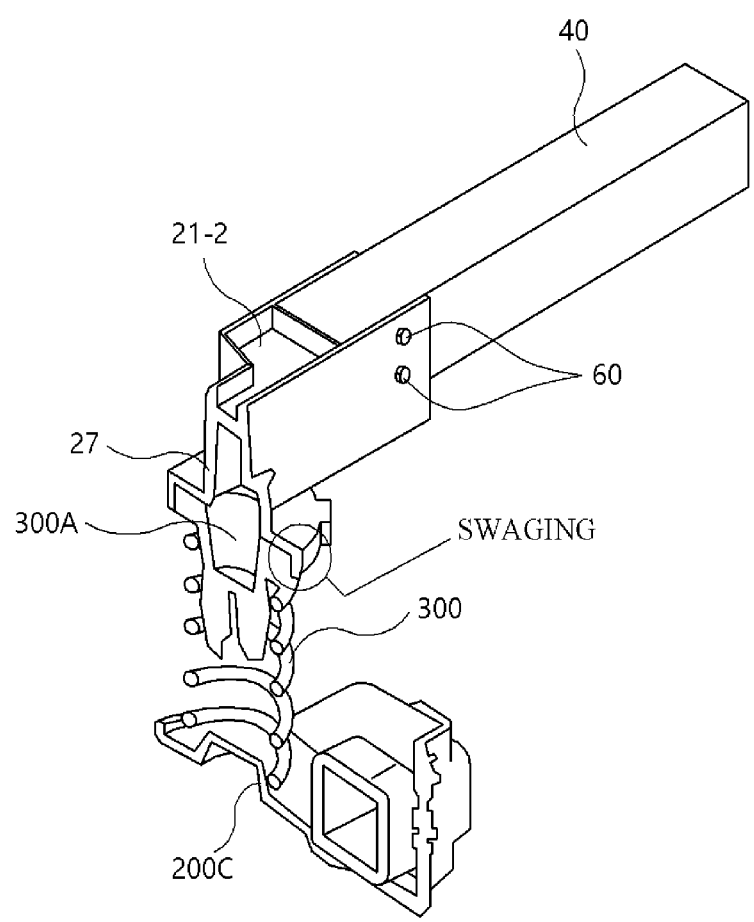
FIG. 7 is a cross-sectional perspective view of an assembly in which a chassis spring of a rear wheel suspension is supported using a spring seat of a component integration type rear lower according to embodiments of the present invention.

Referring to FIG. 7, in a state in which the chassis spring 300 is located between the spring seating portion 200C of the CTBA 200 and the spring seat 27 of the rear lower 20, the cup-shaped structure of the spring seat 27 swags to be coupled to an outer diameter of the spring cup 300A.

As described above, in the side connection member 10 applied to the vehicle body frame 1 according to the present embodiment, a connection section in which the side sill 30 constituting a frame of the intermediate section of the vehicle is connected to the rear side member 40 constituting a frame of the rear section of the vehicle is formed with the body frame 21 having a predetermined length at a height difference formed by the rear lower ground clearance H, and the rear lower 20, in which the front-rear connection members (i.e., the center connector 21-1 and the rear connector 21-2) fixing the side sill 30 and the rear side member 40 which form the battery space width Lb, the bush mounting members (i.e., the center connector 21-1 and the bush mounting hole 23) engaged with the bush 100, and the CTBA mounting members (i.e., the trailing arm connector 25, the spring seat 27 and the shock absorber connector 29) on which the rear wheel suspension is mounted are integrated with the body frame 21, is included.

Therefore, the side connection member 10 is formed in a structure of a component integration type rear lower using die-casting so that, due to structure simplification, it is possible to reduce a weight and a material cost and secure rigidity of the CTBA 200. In particular, due to moldability of the die-casting according to a size of the rear lower 20, the rear lower 20 may be easily modified according to a design intent of a PBV.

A vehicle body frame to which a component integration type rear lower of embodiments of the present disclosure is applied implements the following actions and effects.

First, a rear lower is manufactured in a component integration type structure by die-casting and applied to a side sill and a rear side member of the vehicle body frame so that a weight reduction can be achieved due to structure simplification with respect to a rear connection structure.

Second, the component integration type rear lower is directly engaged with a coupled torsion beam axle (CTBA) and a chassis spring of a rear wheel suspension in an integrated CTBA mounting structure so that robustness of chassis mounting rigidity, which is a main path of driving noise due to transmission of a vibration caused by driving to a vehicle body, can be secured and thus driving noise reduction performance is improved.

Third, the component integration type rear lower locates a shock absorber of the rear wheel suspension inside a rear lower member in the integrated CTBA mounting structure so that a wider inner space can be secured by as much as a position movement of the shock absorber.

Fourth, the component integration type rear lower is capable of engaging a bush with a side sill in an integrated bush mounting structure so that a bush space formed between the side sills according to the related art can be removed and thus a space of a high voltage battery can be expanded when compared to the related art, thereby securing a larger battery capacity.

Fifth, the rear lower is manufactured in a component integration type structure by die-casting and applied to the rear connection structure of the vehicle body frame so that a number of reinforcing materials which are applied in the related art can be removed and thus a material cost and a mold cost according to a manufacturing of a single product can be reduced and an investment cost of a jig assembly and a weight according to a single product assembly can be reduced.

Sixth, the component integration type rear lower is manufactured by die-casting so that the component integration type rear lower can be easily adjusted according to rear lower specifications (i.e., a size and a length) and thus it is suitable for a design characteristic of a purpose built vehicle (PBV) which requires a length change according to the purpose of the vehicle.

While embodiments of the present disclosure have been described with reference to the accompanying drawings, it will be apparent to those skilled in the art that various changes and modifications can be made without departing from the spirit and scope of the present disclosure without being limited to the exemplary embodiments disclosed herein. Accordingly, it should be noted that such alternations or modifications fall within the claims of the present disclosure, and the scope of the present disclosure should be construed on the basis of the appended claims.

What is claimed is:

1. A component integration type rear lower comprising:
   a body frame having an end portion of a first side and an end portion of a second side, and having a predetermined length;
   a front-rear connection member connecting a side sill at the end portion of the first side and connecting a rear side member at the end portion of the second side;
   a bush mounting member coupling a bush to the end portion of the first side; and
   a coupled torsion beam axle (CTBA) mounting member coupled to at least one of a CTBA, a chassis spring, or a shock absorber, the at least one of the CTBA, the chassis spring, or the shock absorber being engaged with the end portion of the second side,
   wherein the front-rear connection member comprises a center connector on which the side sill is to be placed from a top on an upper surface open space portion extending from the end portion of the first side, and a rear connector extending from the end portion of the second side to an open space and in which the rear side member is to be fitted in an upper surface of the open space.

2. The component integration type rear lower of claim 1, wherein the body frame is made of aluminum and is molded by die-casting, and wherein the front-rear connection member, the bush mounting member, and the CTBA mounting member are integrated.

3. The component integration type rear lower of claim 1, wherein the body frame has a height difference between the end portion of the first side and the end portion of the second side to define a rear lower ground clearance.

4. The component integration type rear lower of claim 1, wherein the body frame has an "H" cross-sectional structure.

5. The component integration type rear lower of claim 1, wherein the rear connector forms an inner wall in a lateral direction with respect to an upper surface in which the rear side member is to be fitted so as to allow an end surface of the rear side member to be pressed against.

6. The component integration type rear lower of claim 1, wherein the bush mounting member includes a bush mounting hole drilled in a center connector extending from the end portion of the first side to define an upper surface open space so as to allow the side sill to be mounted from above.

7. The component integration type rear lower of claim 1, wherein the CTBA mounting member includes:
a trailing arm connector protruding from the end portion of the first side to define a first lateral open space so as to allow a partial portion of the CTBA to be fitted at a first lateral portion;
a spring seat protruding from a lower surface of the end portion of the second side to define a lower surface open space so as to allow an upper portion of the chassis spring to be fitted from above; and
a shock absorber connector defining a second lateral open space at a side surface of the end portion of the second side so as to allow an upper portion of the shock absorber to be fitted in a second lateral portion.

8. The component integration type rear lower of claim 7, wherein a rear lower hole for a screw engagement with a bolt and the partial portion of the CTBA is drilled in the trailing arm connector.

9. The component integration type rear lower of claim 1, wherein the side sill is formed in an extruded material structure.

10. A vehicle body frame comprising:
a side sill providing a frame of an intermediate section of a vehicle and expanding to a battery space in which a battery is mounted;
a rear side member providing a frame of a rear section of the vehicle; and
a rear lower including a body frame of a predetermined length with a height difference defining a rear lower ground clearance, wherein a connection section between the side sill and the rear side member is formed of a front-rear connection member, an engagement portion between the side sill and a bush is formed of a bush mounting member, and an engagement portion of a rear wheel suspension is formed of a coupled torsion beam axle (CTBA) mounting member,
wherein the bush mounting member includes a bush mounting hole fixed by a bush shaft in a state in which the bush is fitted in, and wherein, in the connection section of the side sill, the bush mounting hole is formed by being drilled in a center connector extending from the body frame to an upper surface open space in which a partial portion of the side sill is placed from above.

11. The vehicle body frame of claim 10, wherein the rear lower is made of aluminum and is molded by die-casting so that the front-rear connection member, the bush mounting member, and the CTBA mounting member are integrated with the body frame.

12. The vehicle body frame of claim 10, wherein the front-rear connection member fixes the side sill and the rear side member using an engagement member.

13. The vehicle body frame of claim 12, wherein the engagement member and the side sill, and the engagement member and the rear side member, are fixed by a flow drill screw (FDS) method.

14. The vehicle body frame of claim 12, wherein the front-rear connection member includes:
a center connector in which a partial portion of the side sill is to be placed from above in an upper surface open space portion extending from the body frame in a connection section of the side sill; and
a rear connector in which the body frame is extended to an open space so that a partial portion of the rear side member is to be fitted on an upper surface of the open space in a connection section of the rear side member.

15. The vehicle body frame of claim 14, wherein an end portion of the rear side member is in close contact with an inner wall of the rear connector.

16. The vehicle body frame of claim 12, wherein:
a space of the side sill is divided by partition ribs; and
the rear side member forms an open rectangular cross-sectional structure or a closed rectangular cross-sectional structure.

17. The vehicle body frame of claim 16, wherein:
the partition ribs are fixed to a center connector of the rear lower by an FDS method; and
the center connector extends from an end portion of a first side to provide an upper surface open space so as to allow the side sill to be placed from above.

18. The vehicle body frame of claim 10, wherein:
the rear wheel suspension includes a CTBA, a chassis spring, and a shock absorber; and
the CTBA mounting member is engaged with at least one of the CTBA, the chassis spring, or the shock absorber.

19. The vehicle body frame of claim 18, wherein the CTBA mounting member includes:
a trailing arm connector protruding from a side surface of the body frame to define a lateral open space in which a trailing arm of the CTBA is to be fitted in a side portion in the connection section of the side sill;
a spring seat protruding from a lower surface of the body frame to define a lower surface open space in which an upper portion of the chassis spring located in a spring seating portion of the CTBA is to be fitted from above in the connection section of the rear side member; and
a shock absorber connector recessed in a side surface of a first side of the body frame to define a lateral open space in which an upper portion of the shock absorber is to be fitted in a side portion in the connection section of the rear side member.

20. The vehicle body frame of claim 19, wherein the trailing arm connector forms a rear lower hole which is screw-coupled to a bolt fixed to the trailing arm.

21. The vehicle body frame of claim 19, wherein the spring seat has a cup-shaped structure which surrounds an outer diameter of a spring cup provided in the upper portion of the chassis spring.

22. The vehicle body frame of claim 10, wherein:
the side sill includes a left side sill and a right side sill; and
a vehicle width including the battery space is as great as a separation distance between the left side sill and the right side sill.

23. The vehicle body frame of claim 22, wherein the left side sill and the right side sill are connected by a center extruded material crossing the vehicle width.

\* \* \* \* \*